A. J. DAVIS, Jr.
CALK ATTACHMENT FOR HORSESHOES.
APPLICATION FILED NOV. 20, 1912.
1,131,998.
Patented Mar. 16, 1915.
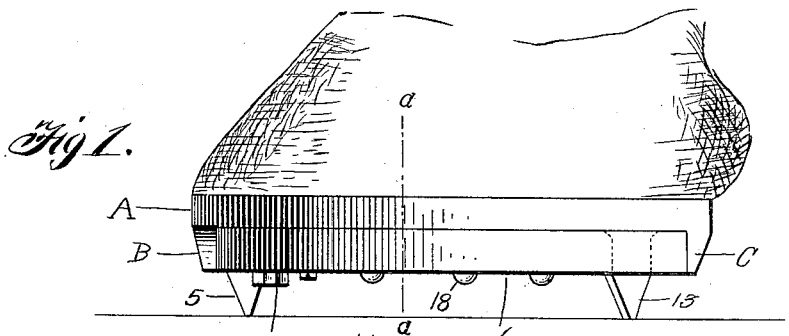
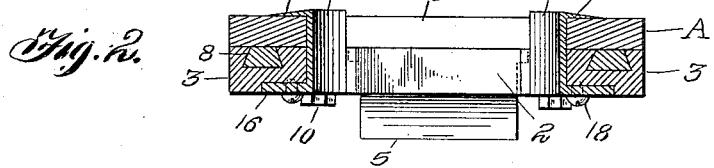
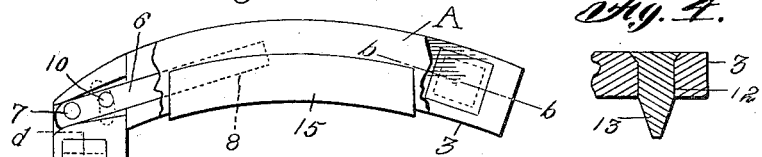
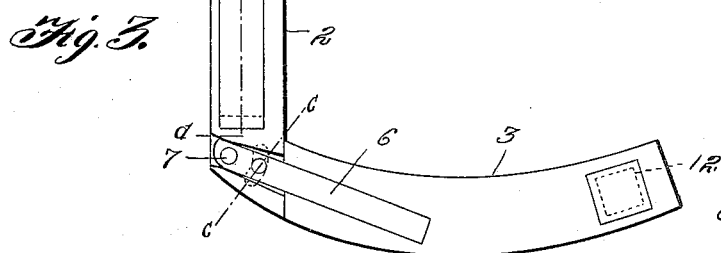
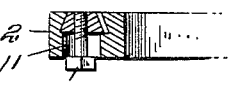
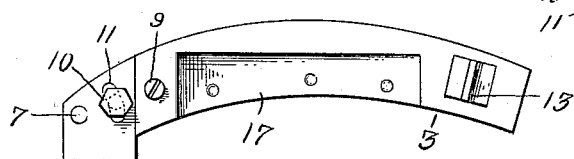
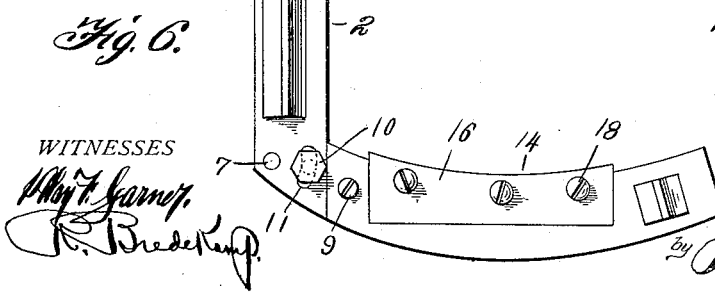
WITNESSES
INVENTOR
Andrew J. Davis, Jr.
by J. W. Garner
Attorney

UNITED STATES PATENT OFFICE.

ANDREW J. DAVIS, JR., OF BALTIMORE, MARYLAND.

CALK ATTACHMENT FOR HORSESHOES.

1,131,998.     Specification of Letters Patent.     Patented Mar. 16, 1915.

Application filed November 20, 1912. Serial No. 732,475.

*To all whom it may concern:*

Be it known that I, ANDREW J. DAVIS, Jr., a citizen of the United States, residing in the city of Baltimore and State of Maryland, have invented certain new and useful Improvements in Calk-Attachers for Horseshoes, of which the following is a specification.

This invention is an improved calk attacher for horse shoes arranged to fit on the bottom of a horse shoe, having means whereby it may be detachably secured to the horse shoe and also provided with calks, and serving for rough shoeing a horse to prevent him from slipping on ice and sleet, without the necessity of removing the ordinary horse shoe from the horse's hoof and applying shoes with sharp calks thereto, the invention consisting in the construction, combination and arrangement of devices hereinafter described and claimed.

One object of my invention is to provide an improved form of calk attacher which may be adjusted to fit a horse shoe of any size.

Another object is to combine with the calk attacher improved means for detachably securing the same to the bottom of a horse shoe.

Another object is to effect improvements in the construction of the attacher and the calks, whereby the latter are rendered detachable so that they may be removed and replaced when worn and whereby the calks are held in place in the attacher by the direct pressure of the horse shoe on the calks.

In the accompanying drawing:—Figure 1 is a side elevation of a calk attacher constructed in accordance with my invention, showing the same in use on the bottom of a horse shoe. Fig. 2 is a vertical transverse sectional view of the same on the plane indicated by the line *a—a* of Fig. 1. Fig. 3 is a plan of my improved calk attacher. Figs. 4 and 5 are detailed sections on the planes indicated by the lines *b—b* and *c—c*, respectively, of Fig. 3. Fig. 6 is a detail inverted plan of the same. Fig. 7 is a detail sectional view on the plane indicated by the line *d—d* of Fig. 3.

For the purposes of this specification, an ordinary horse shoe is indicated at A, provided with a toe calk B and heel calks C. My calk attacher is indicated at 1 and is of a size and shape adapting it to be fitted on the bottom of the horse shoe between the calks thereof.

In the form of my invention here shown, the calk attacher comprises a toe piece 2 and a pair of side pieces 3. The toe piece fits against the rear side of the toe calk of the horse shoe and has an opening 4 larger at its upper side than at its lower side and in which is detachably fitted a sharp or other suitable calk 5, the upper side of which is flush with that of the toe piece and bears directly against the bottom of the horse shoe so that the said calk is held in place by the direct downward pressure of the horse shoe.

Connecting bars 6 have their front ends pivotally mounted as at 7 in recesses in the toe piece. The rear portions of these connecting bars are longitudinally movable and fitted in longitudinal grooves 8 in the upper portion of the side pieces 3. These connecting bars are dove-tailed and the grooves are correspondingly shaped and the bars are clamped at any desired longitudinal adjustment in the side pieces by suitable clamping means such as set screws 9. Hence, the side pieces are longitudinally adjustable with reference to the toe piece to adapt the attacher to be used with a horse shoe of any length. Since the connecting bars of the side pieces are pivoted to the toe piece, the side pieces may also be adjusted toward and from each other to adapt the attacher to be used in connection with a horse shoe of any width.

Set screws 10 are provided for the connecting bars which operate in curved slots 11 with which the toe piece is provided. The side pieces have openings 12 near their rear ends to receive heel calks 13. These openings present downwardly converging walls and are square in horizontal section and the calks are correspondingly shaped so that the calks may be adjusted to any required position in the openings. The upper ends of the calks are flush with the upper surfaces of the side pieces so that the horse shoe bears on the calks and holds them in place.

Any of the calks of my attacher may be removed and replaced by another when worn. To hold the calk attacher on the bottom of the horse shoe, I provide a pair of clamps 14 which are curved longitudinally to fit on the inner side of the side pieces, each clamp having an outwardly projecting cross sectionally wedge-shaped flange 15 at its upper side to bear on the upper side of the horse shoe and an outwardly projecting lower flange 16 to bear under one of the side pieces of the attacher. Said side pieces have recesses 17 to receive said lower flanges, and said lower flanges have clamping screws 18 to bear against the bottoms of said recesses and cause the clamps to securely and yet detachably clamp the calk attacher to the horse shoe.

My improved calk attacher with its calks may be fitted to an ordinary horse shoe without the necessity of removing the latter from the horse's hoof and in a very few minutes, thus enabling a horse to be expeditiously sharp-shod without removing the shoes. The attacher may also be almost instantly detached from the shoe.

While I have herein shown and described a preferred form of my invention, I would have it understood that changes may be made in the form, proportion and construction of the several parts without departing from the spirit of my invention and within the scope of the appended claims.

I claim:—

1. In combination with a horseshoe having toe and heel calks, a horseshoe calk attacher on the under side of the shoe, comprising a toe piece bearing against the rear side of the toe calk and side pieces bearing under the sides of the shoe, and also bearing, at their rear ends, against the front sides of the heel calks, and means to secure the side pieces of the calk attacher to the sides of the shoe.

2. A horse shoe calk attacher of approximately horse shoe shape and comprising a toe piece, connecting bars pivotally connected to the toe piece for movement toward and from each other, and side pieces connected to said connecting bars for longitudinal adjustment thereon to vary the length of the attacher, said toe piece having recesses in its upper side in which the front ends of the connecting bars are arranged and also having vertical slots, and set screws extending through and movable in said slots, threaded to the connecting bars and having heads to bear against the lower side of the toe piece and adjustably clamp the connecting bars thereto.

3. A horse shoe calk attacher of approximately horse shoe shape and comprising a toe piece, connecting bars pivotally connected to the toe piece for movement toward and from each other, and side pieces connected to said connecting bars for longitudinal adjustment thereon to vary the length of the attacher, the side pieces of the attacher having longitudinal grooves in their upper sides to receive the connecting bars and being also provided with set screws to secure the connecting bars in adjusted position.

In testimony whereof I affix my signature in presence of two witnesses.

ANDREW J. DAVIS, Jr.

Witnesses:
J. W. GARNER,
KATHRYN A. DAVIS.

Copies of this patent may be obtained for five cents each, by addressing the "Commissioner of Patents, Washington, D. C."